US010838835B2

(12) United States Patent
Smith et al.

(10) Patent No.: US 10,838,835 B2
(45) Date of Patent: Nov. 17, 2020

(54) SCHEDULING PERIODIC CPU CORE DIAGNOSTICS WITHIN AN OPERATING SYSTEM DURING RUN-TIME

(71) Applicant: Intel Corporation, Santa Clara, CA (US)

(72) Inventors: Carey W. Smith, Hillsboro, OR (US); Julian J. Revuelta, Gilbert, AZ (US); Mihai D. Mihalache, Feldkirchen (DE)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 15/858,492

(22) Filed: Dec. 29, 2017

(65) Prior Publication Data

US 2019/0050309 A1    Feb. 14, 2019

(51) Int. Cl.
*G06F 11/26* (2006.01)
*G06F 11/263* (2006.01)
*G06F 11/22* (2006.01)

(52) U.S. Cl.
CPC ........ *G06F 11/263* (2013.01); *G06F 11/2242* (2013.01); *G06F 11/26* (2013.01)

(58) Field of Classification Search
CPC .......................... G06F 11/2242; G06F 11/263
USPC ...................................... 714/11, 33
See application file for complete search history.

(56) References Cited

U.S. PATENT DOCUMENTS

2013/0268808 A1* 10/2013 Patil ..................... G06F 11/2242
714/32
2014/0136746 A1* 5/2014 Tiruvallur ............... G06F 13/24
710/269
2015/0293173 A1* 10/2015 Tsuboi ............... G01R 31/3177
714/727
2016/0349322 A1* 12/2016 Shibahara .......... G01R 31/3177
2017/0192862 A1* 7/2017 Xia ..................... G06F 11/2007
2017/0361852 A1* 12/2017 Topp ................. B60W 50/0205
2018/0059183 A1* 3/2018 Maeda ........... G01R 31/318547
2018/0231609 A1* 8/2018 Jain ........................ G06F 11/27

FOREIGN PATENT DOCUMENTS

| CN | 109992456 A | 7/2019 |
|---|---|---|
| DE | 10 2018 130 369 A1 | 7/2019 |

OTHER PUBLICATIONS

Notice of Publication received for Chinese Patent Application No. 201811444129.6, dated Jul. 15, 2019, 4 pages.

* cited by examiner

*Primary Examiner* — Chae M Ko
(74) *Attorney, Agent, or Firm* — Spectrum IP Law Group LLC

(57) ABSTRACT

Methods and apparatus relating to characterizing proximity risks within a radio mesh are described. In an embodiment, test manager logic causes periodic testing of one of a first group of processor cores or a second group of processor cores. Each of the first group of processor cores or the second group of processor cores comprises one or more processor cores of a multi-core processor. Memory stores information corresponding to the period testing of the first group of processor cores and the second group of processor cores. A fault signal is to be generated in response to completion of the period testing outside a Fault Tolerant Time Interval (FTTI). Other embodiments are also disclosed and claimed.

23 Claims, 9 Drawing Sheets

US 10,838,835 B2

SCHEDULING PERIODIC CPU CORE DIAGNOSTICS WITHIN AN OPERATING SYSTEM DURING RUN-TIME

FIELD

The present disclosure generally relates to the field of electronics. More particularly, an embodiment relates to scheduling periodic Central Processing Unit (CPU) core diagnostics within an Operating System (OS) during run-time.

BACKGROUND

Autonomous driving promises a world where a vehicle can transport its passengers from point A to point B with ultimate safety and with minimal human intervention. At the same time, well-publicized accidents cast a shadow on trustworthiness of autonomous driving systems.

To address such issues, the automotive industry mandates stringent functional safety requirements and expects technology providers to certify their devices for autonomous driving deployments.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, the automotive industry mandates stringent functional safety requirements and expects technology providers to certify their devices for autonomous driving deployments. For example, processors (also interchangeably referred to herein as CPUs (Central Processing Units)) intended for automotive applications must receive ASIL-B (Automotive Safety Integrity Level B) functional safety certification. This certification requires that 90% of Single Point Faults, which may occur, must be detected before the fault can result in a hazardous event. To guarantee this, designs have a Fault Tolerant Time Interval (FTTI), which is the minimum time period from the occurrence of a fault in an item/component to the occurrence of a hazardous event, if a safety mechanism is not activated.

To this end, some embodiments relate to scheduling periodic processor core diagnostics within an Operating System (OS) during run-time. One or more embodiments support techniques for supporting and scheduling core run-time Structural Based Functional Test (SBFT) execution to achieve ASIL-B certification for CPUs. An embodiment allows SBFTs to execute, in support of functional safety requirements, while supporting concurrent real-time operation of applications running on the system. Generally, structural testing aims to find faults with the structure of a device (which could result in a catastrophic failure), whereas functional testing aims to ensure that a device performs its desired function. As discussed herein, SBFT generally refers to a test that is executed at microcode (uCode) level to satisfy the certification requirements for 90% of Single Point Faults.

Figure 1:
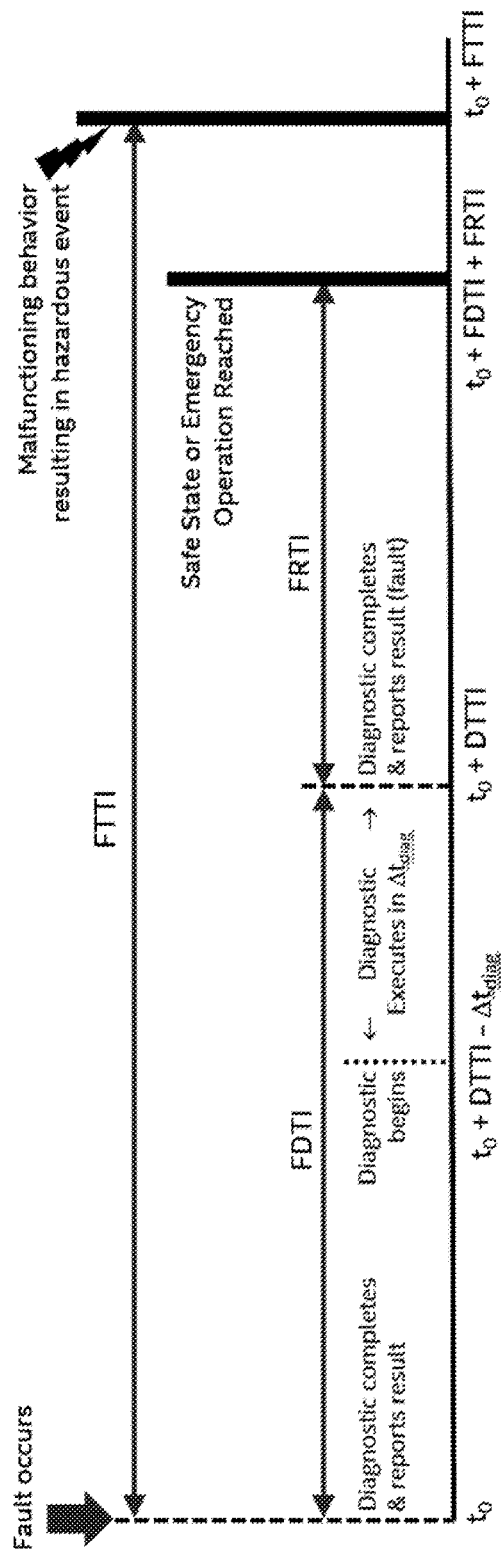
FIG. 1 illustrates a diagram of timing requirements for a processor intended for automotive applications, according to an embodiment.

FIG. 1 illustrates a diagram of timing requirements for a processor intended for automotive applications, according to an embodiment. As shown, at time to (when a fault occurs) prior normal operation is completed (e.g., diagnostic completes and results reported). Diagnostic begins at time $t_0+DTTI-\Delta t_{diag}$ (where $\Delta t_{diag}$ refers to diagnostic execution time period and DTTI refers to Diagnostic Test Time Interval). Diagnostic completes and result reported at time $t_0+DTTI$. Safe state or emergency operation is reached at time $t_0+FDTI+FRTI$ (where FDTI refers to Fault Detection Time Interval and FRTI refers to Fault Reaction Time Interval). And, at time $t_0+FDTI$ the hazard even occurs.

Moreover, for CPUs running applications requiring functional safety, during run-time operation of the design, a battery of diagnostic tests are executed on each core of the CPU, each FTTI interval. For automotive applications, this FTTI interval is typically about 100 milliseconds. In order to achieve 70% diagnostics coverage on cores (i.e., to achieve the aforementioned 90% Single Point Fault Metric), a series of low-level microcode-level tests (called SBFT) are executed on each core once per FTTI. Also, as discussed herein, "automotive" generally refers to any vehicle capable of operating in accordance with or in response to operation(s) performed by a multi-core processor (being periodically tested in accordance with some embodiments), such as an automobile, a truck, a motorcycle, an airplane, a helicopter, etc. whether or not the vehicle is a passenger or commercial vehicle and regardless of the power source type used to move the vehicle.

Figure 2:
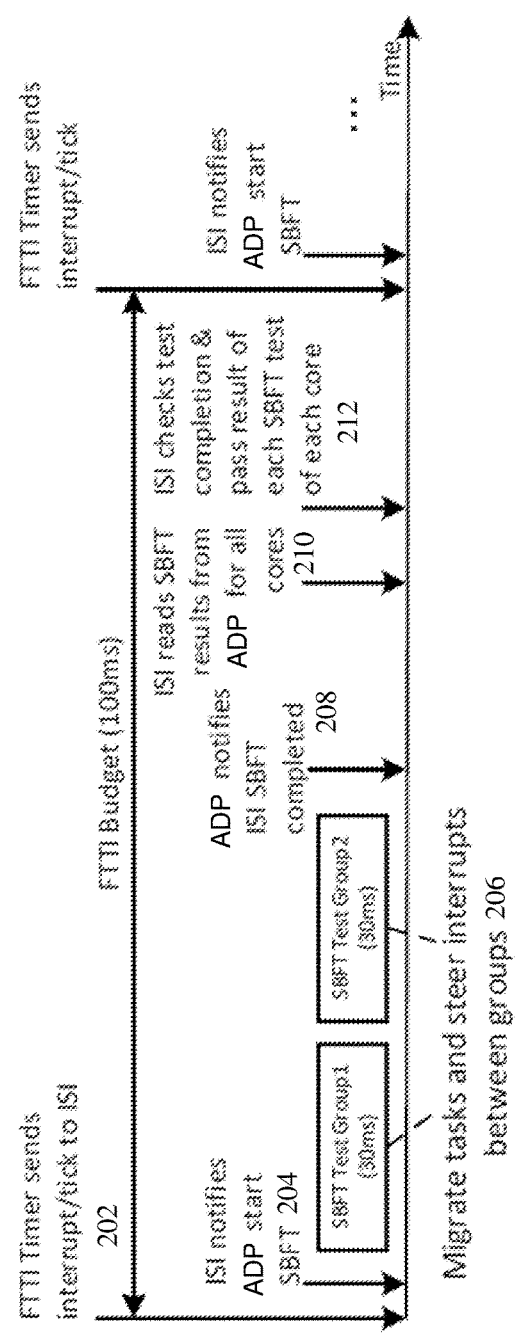
FIG. 2 illustrates a timing diagram for handling interrupts, according to an embodiment.

FIG. 2 illustrates a timing diagram for handling interrupts, according to an embodiment. Moreover, even though some figures indicate specific values, these are merely intended as an implementation choice and the specified values may be changed for different implementations in various embodiments. As shown, FTTI timer sends an interrupt/tick to ISI at 202. As discussed herein, ISI (a.k.a., InSI™) is a Safety Island (or protected module), which may be provided by Intel Corporation. The Safety Island may orchestrate the Functional Safety related diagnostics required either at run-time or "key-on/off" phases of operation. ISI logic can be implemented as a discrete component or integrated into the Platform Control Hub (PCH) in an embodiment. Referring to FIG. 2, ISI notifies Automated Driving Platform (ADP) to start SBFT at 204. Tasks are migrated and interrupts steered between test groups at 206. At 208, ADP notifies ISI that SBFT is completed. At 210, ISI reads SBFT results from ADP for all cores. ISI then checks test completion and pass results of each SBFT test for each core at 212 after which the FTTI budget (e.g., 100 ms) is used up and the next cycle starts.

One issue is that while SBFTs are executing on a core, the core is not available to execute software (equivalent to MWAIT(C6) or Monitor Wait C6) or respond to any interrupt sources, for the entire duration of the test (which can be in excess of 30 milliseconds). Therefore, in order to meet system real-time operation requirements, it becomes necessary to find a method of scheduling SBFT execution amongst the cores of a multi-core processor to allow system real-time processes to continue to operate and service incoming events. Simply taking all cores offline for 30 milliseconds per FTTI is not a realistic option.

Further, Hyper-Threading™ Technology (provided by Intel® Corporation) introduces additional complexity due to SBFT potentially having an effect on the entire core, which in turn demands careful synchronization of hardware-thread-level execution. As discussed herein, Hyper-Threading generally refers to a simultaneous multithreading (SMT) implementation used to improve parallelization of computations to execute multiple tasks/threads simultaneously. Hence, due to the potential complexity, Hyper-Threading may be disabled. Hence, such a solution suffers from having to disable multithreading features.

Additionally, embodiments that cause scheduling of periodic CPU core diagnostics allow execution of the required diagnostics utilizing the inherent real-time thread scheduling capabilities of the operating system software and do not require customization of the operating system. This approach allows for concurrent execution on cores with flexible scheduling, allowing optimization of the testing schedule to the specific system workload, without requiring Hyper-Threading to be disabled. Other alternatives may include CPU hot-plug (which cannot meet system real-time performance requirements) or specific OS customization (which is either not possible or deemed too risky by OS architects).

In one embodiment, the processors discussed herein may be included in an IoT device. Moreover, an "IoT" device generally refers to a device which includes electronic processing circuitry (such as one or more processor/cores, PLA (Programmable Logic Array), SoC, ASIC (Application Specific Integrated Circuit), etc.), memory (e.g., to store software or firmware), one or more sensors (or is otherwise coupled to one or more sensors such as a camera, motion detector, etc.), and network connectivity to allow the IoT device to collect and/or exchange data. IoT devices can be cheaper than traditional computing devices to allow for their proliferation at remote locations. IoT devices can also reduce costs by using existing infrastructure (such as the Internet, a (third generation (3G), fourth generation (4G), or fifth generation (5G) cellular/wireless network, etc.). More generally, an IoT device may include one or more components such as those discussed with reference to FIG. 1 et seq.

Figure 3:
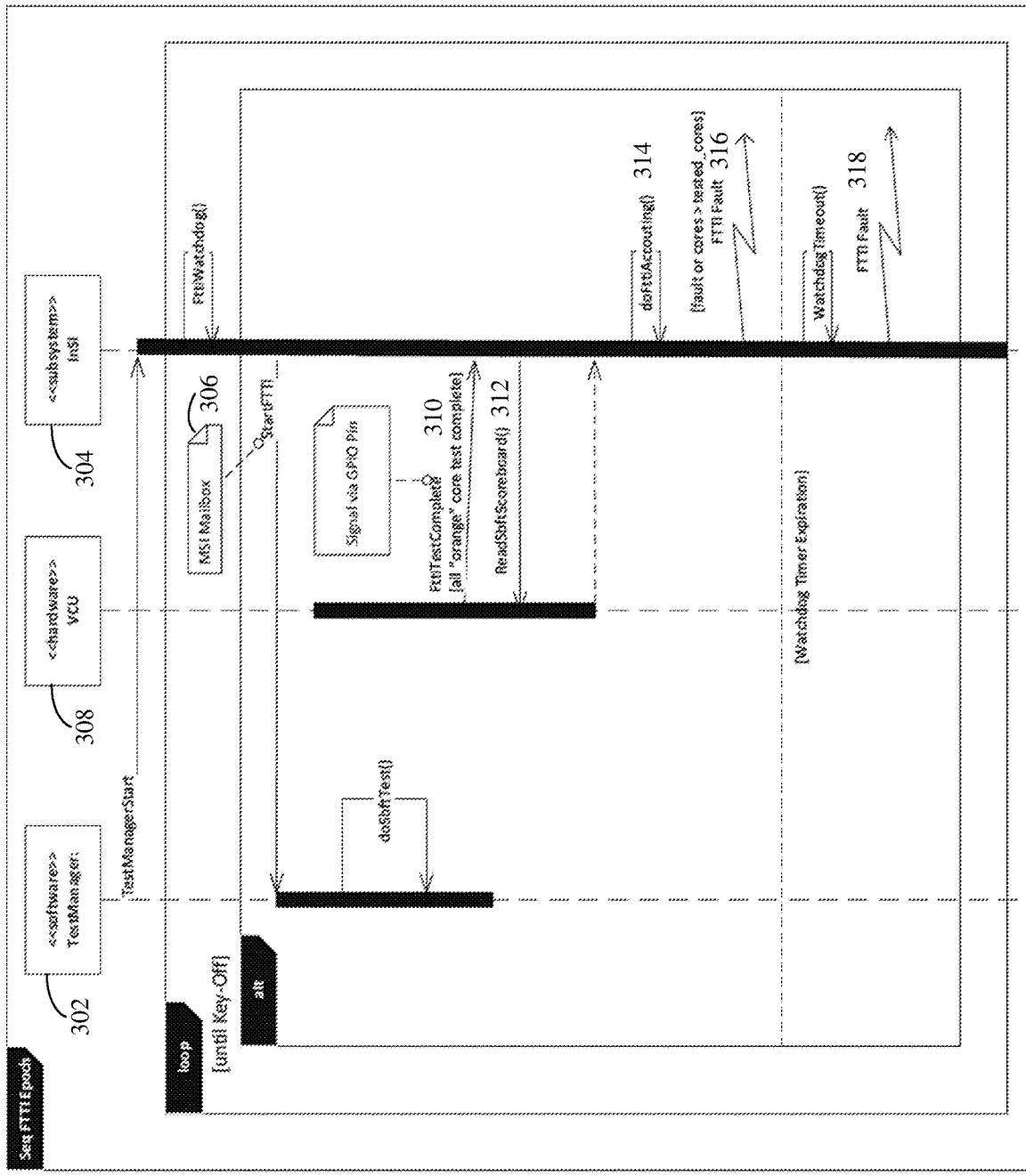
FIGS. 3, 4, 5, and 6 illustrate flow diagrams to implement periodic core diagnostics during run-time, according to some embodiments.

FIG. 3 illustrates a flow diagram to implement periodic SBFT in accordance with an embodiment. One or more operations of FIG. 3 may be performed by logic (e.g., logic 302, 304, 306, etc.) and/or one or more components discussed herein with reference to FIGS. 1-10 (such as a processor, a GPU, etc.). Moreover, even though some figures indicate components as hardware or software, these are merely intended as an implementation choice and such components may be implemented in logic in various embodiments.

Referring to FIG. 3, Test Manager logic 302 can be implemented as an OS driver bound to the ISI logic 304 and interacts with the ISI subsystem via a bi-directional mailbox (labeled as Message Signaled Interrupt (MSI) mailbox 306 in FIG. 3) and/or interrupt signal. Generally, mailbox implementations can differ based on available hardware. As discussed herein, a "mailbox" refers to a method of communication between two entities (e.g., ISI and CPU) where information can be exchanged via a data storage area to which both entities have access. The Test Manager is responsible for signaling the ISI when the OS boot has completed and is ready to begin run-time periodic testing. The Test Manager is responsible for scheduling and running the periodic tests on "orange" cores assigned to the OS instance. The Test Manager maintains synchronization of the FTTI with the ISI via the mailbox and interrupt signal. In some implementations, varying levels of functional safety at the CPU-level may be designated with a different color (e.g., green, orange, red, etc. depending on their levels of functionality). For example, an "orange" core may refer to a core in which the tests mentioned herein are supported (e.g., with medium performance and medium safety), whereas a Red Core may refer to a core which can be linked to another Red Core such that it implements hardware lock step (e.g., with low performance and high safety). Hence, "Orange" cores may simply refer to the cores which are required to run the SBFT tests. Also, only specific cores are required to be periodically tested in some embodiments.

The VCU (Validation Control Unit) logic 308 can be integrated into a processor or CPU (such as those discussed herein with reference to FIGS. 7-10) and maintains information (e.g., a scoreboard) for keeping track of SBFT execution on each core and the pass/fail status (e.g., as indicated by a single bit) of the last SBFT run. When the SBFT information shows that all "orange" cores have completed a SBFT run, the VCU logic generates a signal to the ISI.

As discussed herein, the ISI (a.k.a., InSI™) logic 304 generally refers a Safety Island which may be provided by Intel Corporation, and may be implemented as a discrete component or integrated into the Platform Control Hub (PCH) or a processor in various embodiments. The ISI is responsible for maintaining the FTTI and synchronizing the FTTI with the Test Manager logic. Upon receiving the signal indicating all SBFTs have completed from the VCU logic 310, the ISI reads the VCU scoreboard over the Platform Environment Control Interface (PECI) (for discrete implementations) or another interface (for integrated implementations) at 312. Using the scoreboard data, the ISI completes the test accounting 314 (e.g., within a time period tracked by a watchdog timer as shown in FIG. 3) for the current interval and signals a fault if any tests failed 316. If no signal from the VCU is received before the end of the FTTI (e.g., as marked by expiration of the watchdog timer or watchdog timeout), the ISI signals a fault 318.

Figure 4:
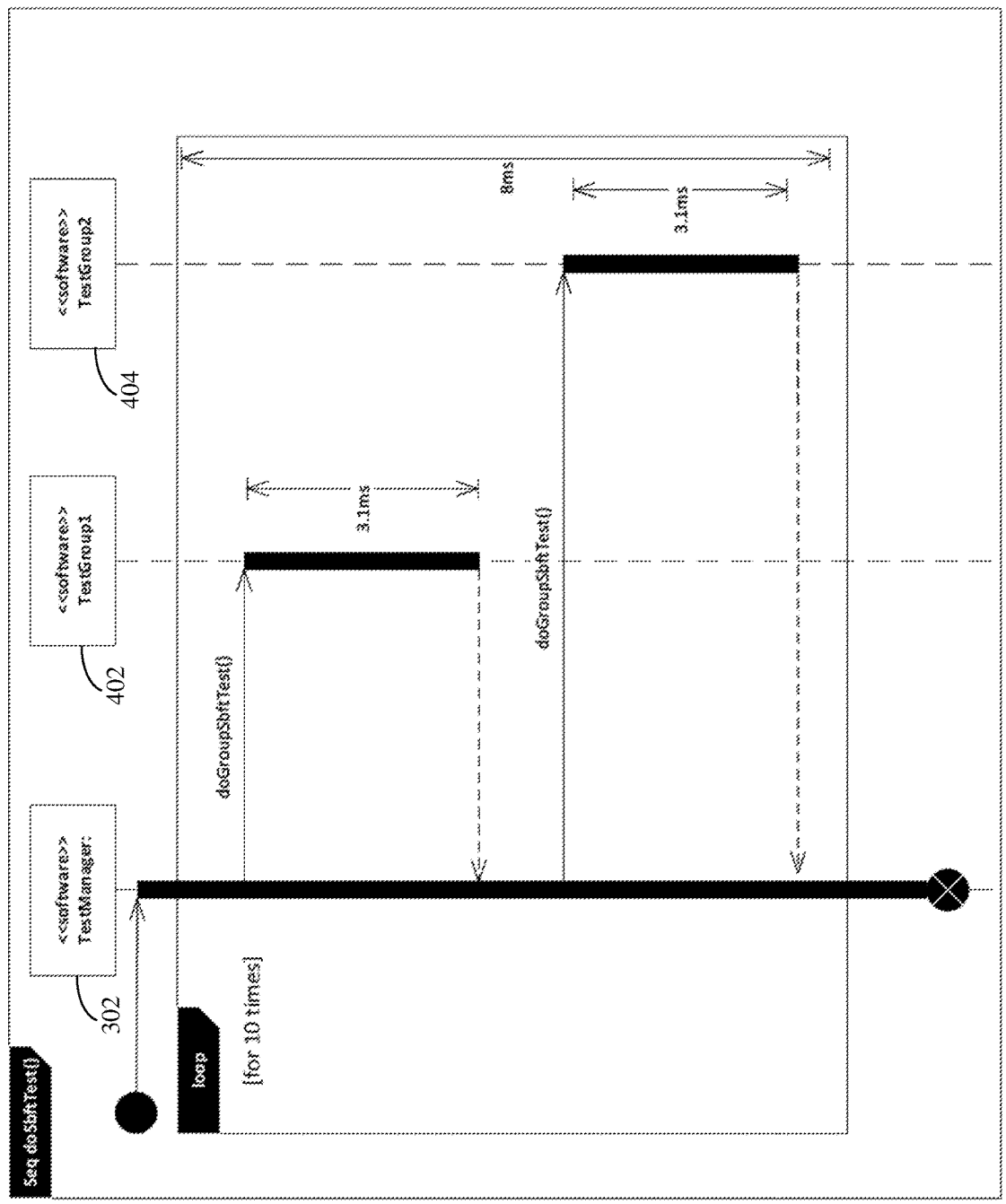

FIG. 4 illustrates a flow diagram for one possible implementation of the Test Manager logic scheduling, according to an embodiment. One or more operations of FIG. 4 may be performed by logic (e.g., logic 302, 304, etc.) and/or one or more components discussed herein with reference to FIGS. 1-10 (such as a processor, a GPU, etc.). Moreover, even though some figures indicate a components as hardware or software, these are merely intended as an implementation choice and such components may be implemented in logic in various embodiments.

As mentioned above, the SBFTs can be implemented in CPU microcode and executed periodically in order to achieve the 70% coverage. While the SBFTs are executing on a core, the core is not available to execute software (equivalent to MWAIT(C6)) or respond to any interrupt sources, for the duration of the test (which can be in excess of 30 milliseconds). Therefore, in order to meet real-time requirements, not all cores can be in this test mode simultaneously. At a minimum, cores are tested in two test groups 402/404 to allow any active tasks and interrupt handling to be migrated from cores under test to cores available to process the workload and handle interrupts.

In an embodiment, the Test Manager logic 302 is implemented as an OS device driver bound to an ISI device function. The Test Manager is responsible for synchronizing the FTTI interval with the ISI and scheduling SBFTs on all cores allocated to the OS instance.

The Test Manager schedules the SBFTs using a pool of real-time threads created during Test Manager initialization—one process group is allocated to each "orange" core group where each process in the group is bound to a hardware thread in said core. The Test Manager invokes a test run by signaling a group of real-time threads, associated with a Test Group, to begin a test cycle. There are multiple possible schedules that the Test Manager can use to manage test execution within a FTTI. However, the Test Manager logic still needs to schedule tests in a minimum of two Test Groups 402/404 and in a way to allow any other real-time workloads to continue to run, by migrating from in-test cores to available cores.

Referring to FIG. 4, one possible Test Manager schedule is shown, where a periodic SBFT is partitioned into 10 test runs of 3.1 ms each. Each of the 10 test runs is executed on TestGroup1 402 followed by a test run on TestGroup2 404. For example, it is equally valid to perform a single test run of 30 ms on TestGroup1 followed by a single test run of 30 ms on TestGroup2, as long as tests are not run simultaneously on both TestGroup1 and TestGroup2, to allow workloads to continue to execute on cores not under test.

In some embodiments, in order to maintain the interrupt service latency requirements for the system, interrupts are allocated to a minimum of one core in each Test Group and interrupt signals steered to a core not currently under test. For devices which are sources of MSI interrupt, this means that the MSI configuration is set accordingly—to send interrupts to a core in each of the Test Groups. The steering of interrupts to cores not-under-test may be accomplished using the Advanced Programmable Interrupt Controller (APIC) Task Priority Register.

Figure 5:
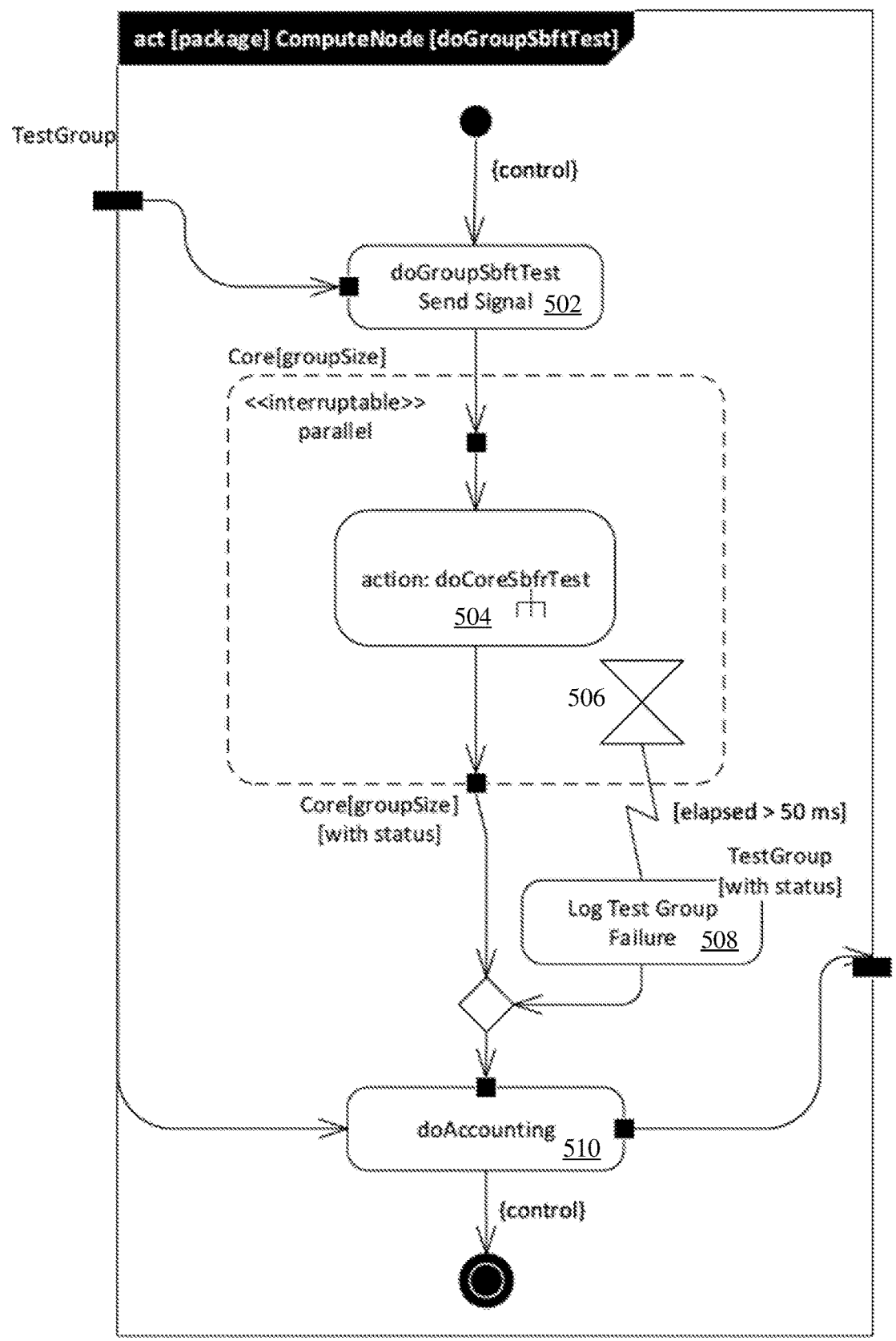

FIG. 5 illustrates a flow diagram for one possible implementation of SBFT group test, according to an embodiment. One or more operations of FIG. 5 may be performed by logic (e.g., logic 302, 304, 308, etc.) and/or one or more components discussed herein with reference to FIGS. 1-10 (such as a processor, a GPU, etc.).

Referring to FIG. 5, the Test Manager logic 302 triggers the real-time threads associated with the cores allocated to the target Test Group at operation 502. After the start of SBFTs on a Test Group at 504, the Test Manager waits at 506 for a completion signal from all real-time threads, e.g., with a timeout period such as 50 ms in an embodiment (which may be indicated by expiration of a timer). This allows detection of a fault by the Test Manager and logging at 508, which will be important for profiling and debug. The method terminates after accounting and updating of profile/debug information at operation 510.

Figure 6:
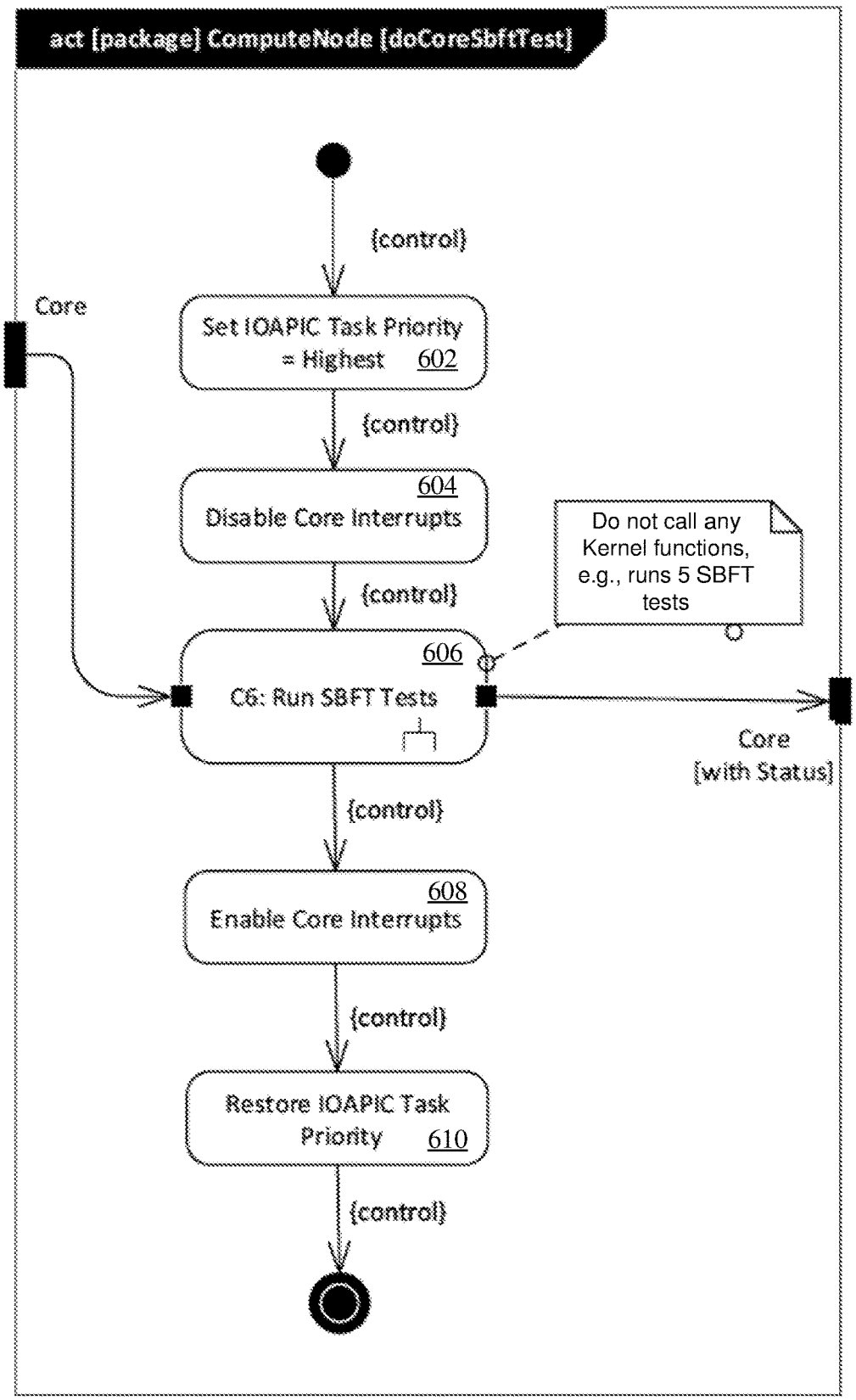

FIG. 6 shows a flow diagram of a real-time thread executing a SBFT, according to an embodiment. The real-time thread begins the test run by storing, then setting the (e.g., IO (Input Output)) APIC Task Priority Register to highest priority at 602, to affect the steering of interrupts to an available core. The real-time thread then disables interrupts on the core at 604, and executes the SBFT at 606. In an embodiment, while SBFT is executing, the CPU core may be in a pseudo-C6 state, where C6 refers to a CPU Power Management State in which only certain events can wake the CPU core. Following SBFT execution, the real-time thread enables interrupts on the core at 608, restores the APIC Task Priority Register at 610, and finally signals completion of the SBFT to the Task Manager, e.g., with status.

Furthermore, some embodiments may be applied in computing devices that include one or more processors (e.g., with one or more processor cores), such as those discussed with reference to FIGS. 1 to 10, including for example small form factor or mobile computing devices, e.g., an IoT device, M2M (Machine to Machine) device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

Figure 7:
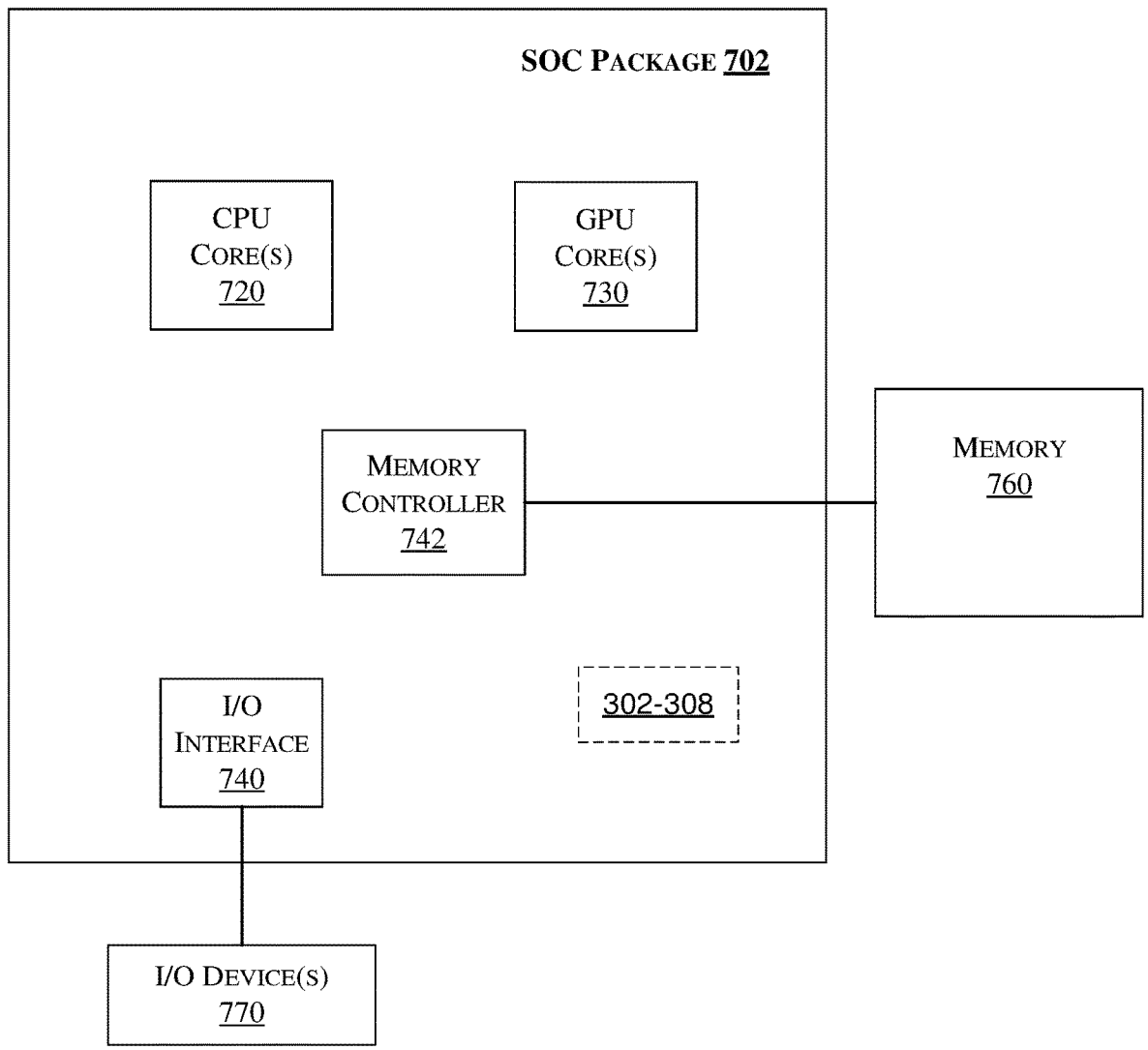
FIGS. 7 and 8 illustrates block diagrams of embodiments of computing systems, which may be utilized in various embodiments discussed herein.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
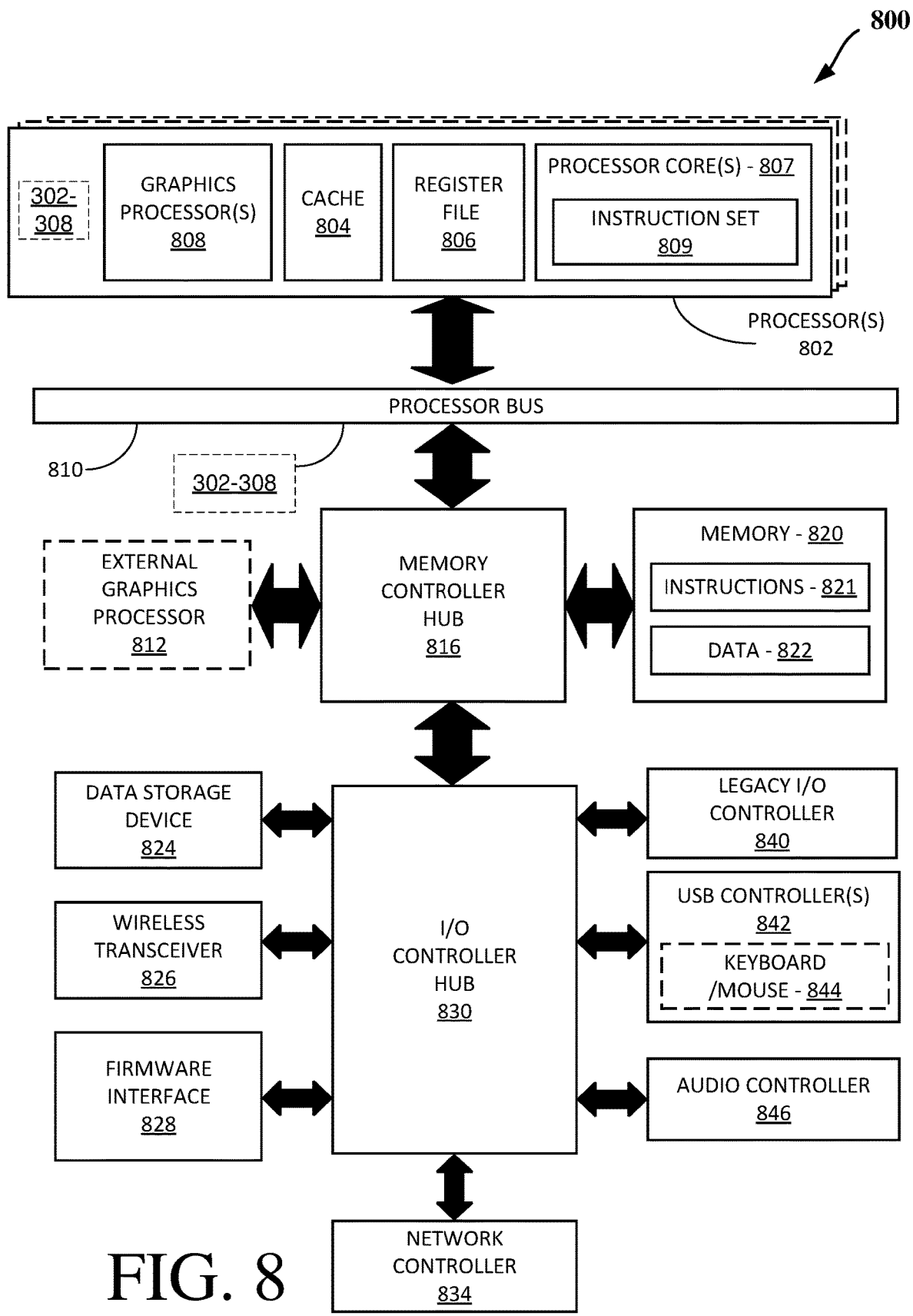

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
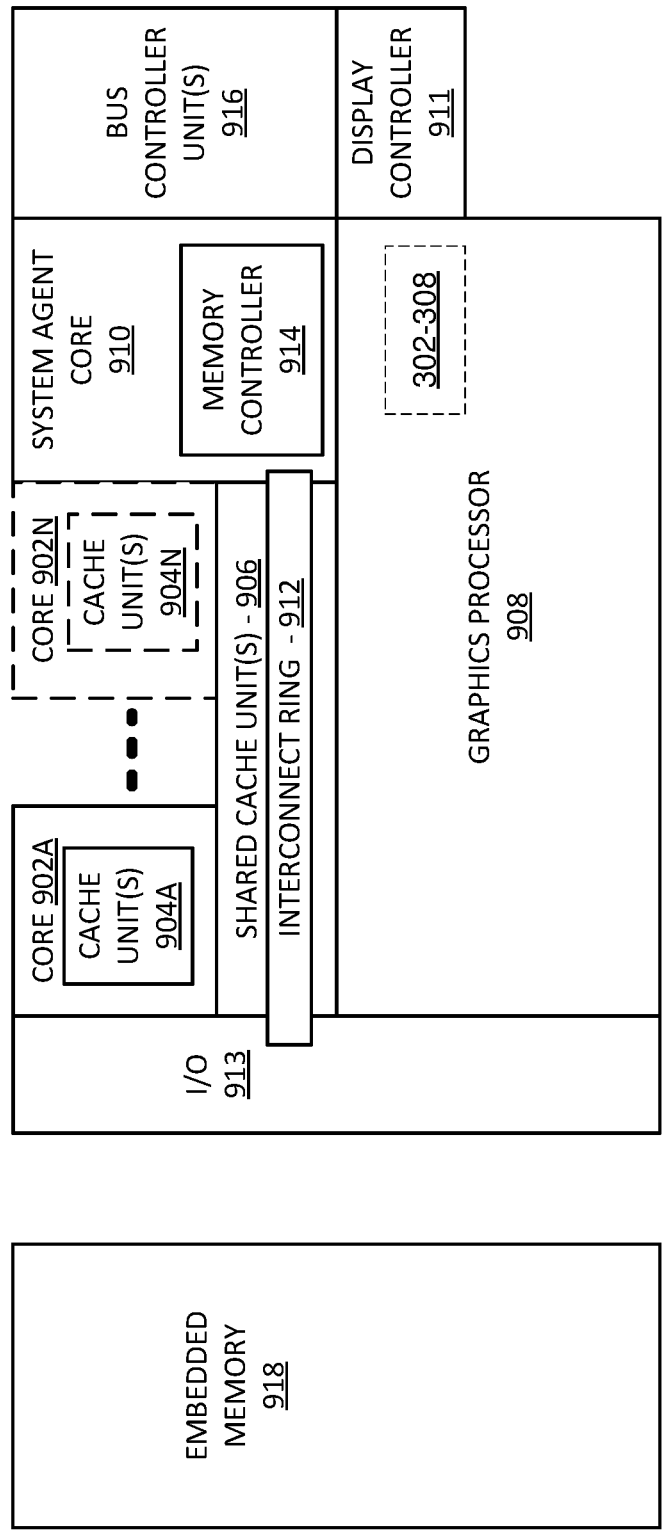
FIGS. 9 and 10 illustrate various components of processers in accordance with some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
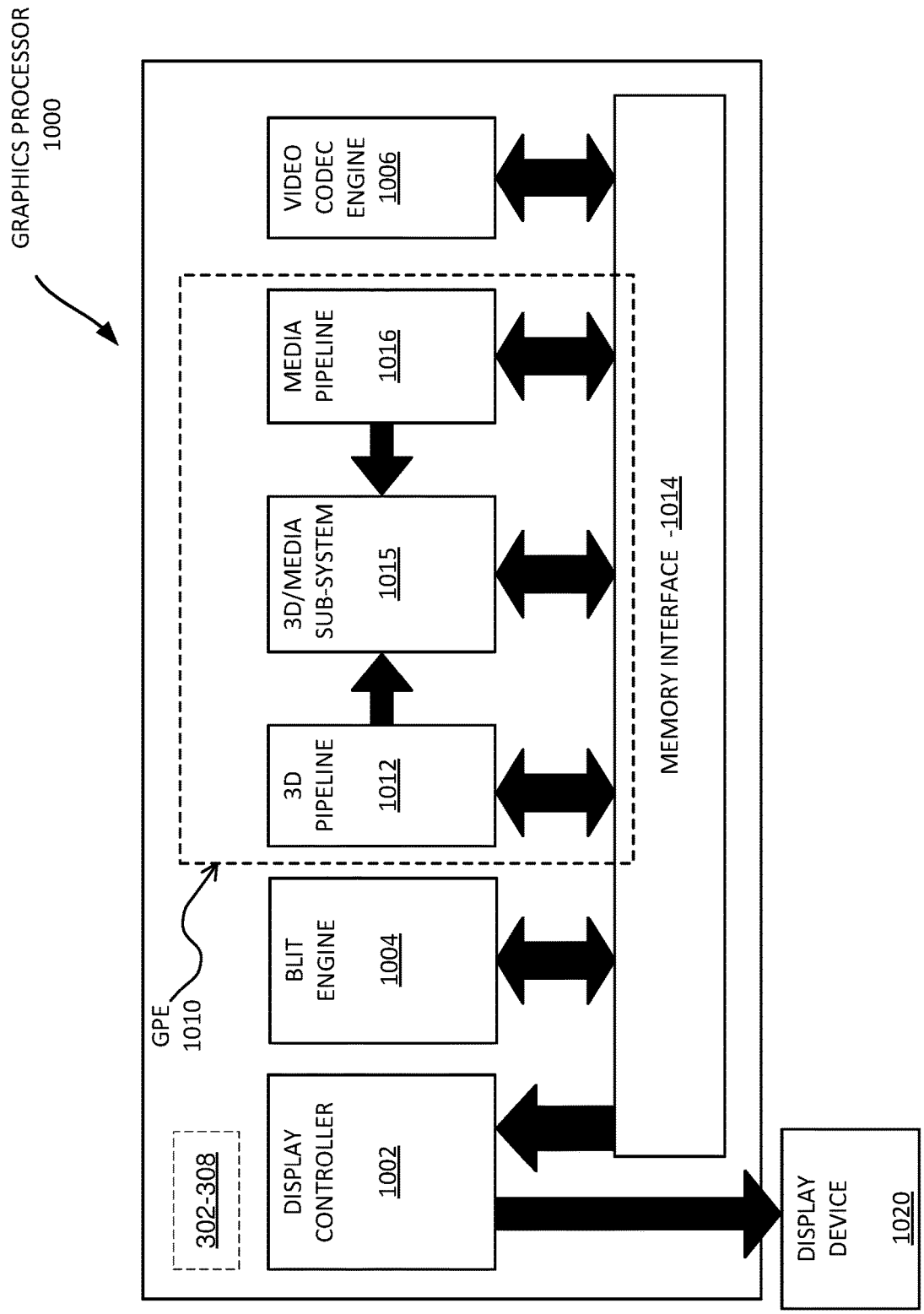

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 10D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media subsystem 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: test manager logic to cause periodic testing of one of a first group of processor cores or a second group of processor cores, wherein each of the first group of processor cores or the second group of processor cores comprises one or more processor cores of a multi-core processor; and memory, coupled to the test manager logic, to store information corresponding to the period testing of the first group of processor cores and the second group of processor cores, wherein a fault signal is to be generated in response to completion of the period testing outside a Fault Tolerant Time Interval (FTTI). Example 2 includes the apparatus of example 1, comprising logic to maintain the information stored in the memory based at least in part on an indication that the period testing of the first group of processor cores or the second group of the processor cores has completed. Example 3 includes the apparatus of example 1, comprising logic to read the stored information after completion of the periodic testing of the first group of processor cores or the second group of the processor cores and cause transmission of the fault signal in response to a determination that a fault has occurred during the FTTI. Example 4 includes the apparatus of example 3, wherein the logic is to read the stored information over a Platform Environment Control Interface (PECI). Example 5 includes the apparatus of example 1, wherein the FTTI corresponds to a minimum time period from occurrence of a fault in at least one of the one or more processor cores to the occurrence of a hazardous event. Example 6 includes the apparatus of example 1, wherein the FTTI is about 100 ms. Example 7 includes the apparatus of example 1, wherein an operating system driver is to comprise the test manager logic. Example 8 includes the apparatus of example 1, wherein a period of the periodic testing is about 30 ms. Example 9 includes the apparatus of example 1, wherein the multi-core processor is capable to execute a plurality of threads simultaneously during the periodic testing. Example 10 includes the apparatus of example 1, wherein the multi-core processor is to be provided in one of: a vehicle or an Internet of Things (IoT) device. Example 11 includes the apparatus of example 10, wherein the vehicle comprises one of: an automobile, a truck, a motorcycle, an airplane, or a helicopter. Example 12 includes the apparatus of example 1, wherein one or more interrupt signals are to be routed to the one or more processor cores via an Advanced Programmable Interrupt Controller (APIC) Task Priority Register. Example 13 includes the apparatus of example 1, wherein a single integrated circuit device comprises one or more of: the test manager logic, the one or more processor cores, and the memory. Example 14 includes the apparatus of example 1, wherein the test manager logic is to cause transmission of a fault signal in response to expiration of a time period prior to receipt of a test completion signal from all processor cores under test. Example 15 includes the apparatus of example 14, wherein the time period is about 50 ms. Example 16 includes the apparatus of example 1, wherein the periodic testing comprises at least one Structural Based Functional Test (SBFT).

Example 17 includes one or more computer-readable medium comprising one or more instructions that when executed on at least one processor configure the at least one processor to perform one or more operations to: cause test manager logic to perform periodic testing of one of a first group of processor cores or a second group of processor cores, wherein each of the first group of processor cores or the second group of processor cores comprises one or more processor cores of a multi-core processor; and store information corresponding to the period testing of the first group of processor cores and the second group of processor cores in memory, wherein a fault signal is to be generated in response to completion of the period testing outside a Fault Tolerant Time Interval (FTTI). Example 18 includes the computer-readable medium of example 17, further comprising one or more instructions that when executed on the at least one processor configure the at least one processor to perform one or more operations to cause maintenance of the information stored in the memory based at least in part on an indication that the period testing of the first group of processor cores or the second group of the processor cores has completed. Example 19 includes the computer-readable medium of example 17, further comprising one or more instructions that when executed on the at least one processor configure the at least one processor to perform one or more operations to cause reading of the stored information after completion of the periodic testing of the first group of processor cores or the second group of the processor cores and cause transmission of the fault signal in response to a determination that a fault has occurred during the FTTI. Example 20 includes the computer-readable medium of example 17, wherein the FTTI corresponds to a minimum time period from occurrence of a fault in at least one of the one or more processor cores to the occurrence of a hazardous event. Example 21 includes the computer-readable medium of example 17, wherein the multi-core processor is capable to execute a plurality of threads simultaneously during the periodic testing. Example 22 includes the computer-readable medium of example 17, wherein the multi-core processor is to be provided in one of: a vehicle or an Internet of Things (IoT) device. Example 23 includes the computer-readable medium of example 17, further comprising one or more instructions that when executed on the at least one processor configure the at least one processor to perform one or more operations to cause routing of one or more interrupt signals to the one or more processor cores via an Advanced Programmable Interrupt Controller (APIC) Task Priority Register. Example 24 includes the computer-readable medium of example 17, further comprising one or more instructions that when executed on the at least one processor configure the at least one processor to perform one or more operations to cause the test manager logic to cause transmission of a fault signal in response to expiration of a time period prior to receipt of a test completion signal from all processor cores under test. Example 25 includes the computer-readable medium of example 17, wherein the periodic testing comprises at least one Structural Based Functional Test (SBFT).

Example 26 includes a computing system comprising: a processor having one or more processor cores; memory, coupled to the processor, to store one or more bits of data; and test manager logic to cause periodic testing of one of a first group of processor cores or a second group of processor cores, wherein each of the first group of processor cores or the second group of processor cores comprises one or more processor cores of the processor; and wherein the memory is to store information corresponding to the period testing of the first group of processor cores and the second group of processor cores, wherein a fault signal is to be generated in response to completion of the period testing outside a Fault Tolerant Time Interval (FTTI). Example 27 includes the computing system of example 23, comprising logic to maintain the information stored in the memory based at least in part on an indication that the period testing of the first group of processor cores or the second group of the processor cores has completed. Example 28 includes the computing system of example 23, comprising logic to read the stored information after completion of the periodic testing of the first group of processor cores or the second group of the processor cores and cause transmission of the fault signal in response to a determination that a fault has occurred during the FTTI. Example 29 includes the system of example 23, wherein the logic is to read the stored information over a Platform Environment Control Interface (PECI). Example 30 includes the system of example 23, wherein the FTTI corresponds to a minimum time period from occurrence of a fault in at least one of the one or more processor cores to the occurrence of a hazardous event. Example 31 includes the system of example 23, wherein the FTTI is about 100 ms. Example 32 includes the system of example 23, wherein an operating system driver is to comprise the test manager logic. Example 33 includes the system of example 23, wherein a period of the periodic testing is about 30 ms. Example 34 includes the system of example 23, wherein the processor is capable to execute a plurality of threads simultaneously during the periodic testing. Example 35 includes the system of example 23, wherein the processor is to be provided in one of: a vehicle or an Internet of Things (IoT) device. Example 36 includes the system of example 35, wherein the vehicle comprises one of: an automobile, a truck, a motorcycle, an airplane, or a helicopter. Example 37 includes the system of example 23, wherein one or more interrupt signals are to be routed to the one or more processor cores via an Advanced Programmable Interrupt Controller (APIC) Task Priority Register.

Example 38 includes a method comprising: causing test manager logic to perform periodic testing of one of a first group of processor cores or a second group of processor cores, wherein each of the first group of processor cores or the second group of processor cores comprises one or more processor cores of a multi-core processor; and storing information corresponding to the period testing of the first group of processor cores and the second group of processor cores in memory, wherein a fault signal is generated in response to completion of the period testing outside a Fault Tolerant Time Interval (FTTI). Example 39 includes the method of example 38, further comprising maintaining the information stored in the memory based at least in part on an indication that the period testing of the first group of processor cores or the second group of the processor cores has completed. Example 40 includes the method of example 38, further comprising reading the stored information after completion of the periodic testing of the first group of processor cores or the second group of the processor cores and cause transmission of the fault signal in response to a determination that a fault has occurred during the FTTI. Example 41 includes the method of example 38, wherein the FTTI corresponds to a minimum time period from occurrence of a fault in at least one of the one or more processor cores to the occurrence of a hazardous event. Example 42 includes the method of example 38, further comprising the multi-core processor executing a plurality of threads simultaneously during the periodic testing. Example 43 includes the method of example 38, further comprising routing one or more interrupt signals to the one or more processor cores via an Advanced Programmable Interrupt Controller (APIC) Task Priority Register. Example 44 includes the method of example 38, further comprising transmitting a fault signal in response to expiration of a time period prior to receipt of a test completion signal from all processor cores under test. Example 45 includes the method of example 38, wherein the periodic testing comprises at least one Structural Based Functional Test (SBFT).

Example 46 includes an apparatus comprising means to perform a method as set forth in any preceding example. Example 47 comprises machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
test manager logic circuitry to cause periodic testing of one of a first group of processor cores or a second group of processor cores, wherein each of the first group of processor cores or the second group of processor cores comprises one or more processor cores of a multi-core processor; and
memory, coupled to the test manager logic circuitry, to store information corresponding to the periodic testing of the first group of processor cores and the second group of processor cores,
wherein a fault signal is to be generated in response to completion of the periodic testing outside an interval, wherein the interval corresponds to a minimum time period from occurrence of a fault in at least one of the one or more processor cores to the occurrence of a hazardous event.

2. The apparatus of claim 1, comprising logic to maintain the information stored in the memory based at least in part on an indication that the periodic testing of the first group of processor cores or the second group of the processor cores has completed.

3. The apparatus of claim 1, comprising logic to read the stored information after completion of the periodic testing of the first group of processor cores or the second group of the processor cores and cause transmission of the fault signal in response to a determination that a fault has occurred during the interval.

4. The apparatus of claim 3, wherein the logic is to read the stored information over a Platform Environment Control Interface (PECI).

5. The apparatus of claim 1, wherein the interval is about 100 ms.

6. The apparatus of claim 1, wherein an operating system driver is to comprise the test manager logic circuitry.

7. The apparatus of claim 1, wherein a period of the periodic testing is about 30 ms.

8. The apparatus of claim 1, wherein the multi-core processor is capable to execute a plurality of threads simultaneously during the periodic testing.

9. The apparatus of claim 1, wherein the multi-core processor is to be provided in one of: a vehicle or an Internet of Things (IoT) device.

10. The apparatus of claim 9, wherein the vehicle comprises one of: an automobile, a truck, a motorcycle, an airplane, or a helicopter.

11. The apparatus of claim 1, wherein one or more interrupt signals are to be routed to the one or more processor cores via an Advanced Programmable Interrupt Controller (APIC) Task Priority Register.

12. The apparatus of claim 1, wherein a single integrated circuit device comprises one or more of: the test manager logic circuitry, the one or more processor cores, and the memory.

13. The apparatus of claim 1, wherein the test manager logic circuitry is to cause transmission of a fault signal in response to expiration of a time period prior to receipt of a test completion signal from all processor cores under test.

14. The apparatus of claim 13, wherein the time period is about 50 ms.

15. The apparatus of claim 1, wherein the periodic testing comprises at least one Structural Based Functional Test (SBFT).

16. One or more non-transitory computer-readable medium comprising one or more instructions that, when executed on at least one processor, configure the at least one processor to perform one or more operations to:
cause test manager logic circuitry to perform periodic testing of one of a first group of processor cores or a second group of processor cores, wherein each of the first group of processor cores or the second group of processor cores comprises one or more processor cores of a multi-core processor; and
store information corresponding to the periodic testing of the first group of processor cores and the second group of processor cores in memory,
wherein a fault signal is to be generated in response to completion of the periodic testing outside an interval, wherein the interval corresponds to a minimum time period from occurrence of a fault in at least one of the one or more processor cores to the occurrence of a hazardous event.

17. The non-transitory computer-readable medium of claim 16, further comprising one or more instructions that, when executed on the at least one processor, configure the at least one processor to perform one or more operations to cause maintenance of the information stored in the memory based at least in part on an indication that the periodic testing of the first group of processor cores or the second group of the processor cores has completed.

18. The non-transitory computer-readable medium of claim 16, further comprising one or more instructions that, when executed on the at least one processor, configure the at least one processor to perform one or more operations to reading of the stored information after completion of the periodic testing of the first group of processor cores or the second group of the processor cores and cause transmission of the fault signal in response to a determination that a fault has occurred during the interval.

19. The non-transitory computer-readable medium of claim 16, wherein the multi-core processor is capable to execute a plurality of threads simultaneously during the periodic testing.

20. The non-transitory computer-readable medium of claim 16, wherein the multi-core processor is to be provided in one of: a vehicle or an Internet of Things (IoT) device.

21. A computing system comprising:
a processor having one or more processor cores;
memory, coupled to the processor, to store one or more bits of data; and
test manager logic circuitry to cause periodic testing of one of a first group of processor cores or a second group of processor cores, wherein each of the first group of processor cores or the second group of processor cores comprises one or more processor cores of the processor; and
wherein the memory is to store information corresponding to the periodic testing of the first group of processor cores and the second group of processor cores, wherein a fault signal is to be generated in response to completion of the periodic testing outside an interval, wherein the interval corresponds to a minimum time period from occurrence of a fault in at least one of the one or more processor cores to the occurrence of a hazardous event.

22. The computing system of claim 21, comprising logic to maintain the information stored in the memory based at least in part on an indication that the periodic testing of the first group of processor cores or the second group of the processor cores has completed.

23. The computing system of claim 21, comprising logic to read the stored information after completion of the periodic testing of the first group of processor cores or the second group of the processor cores and cause transmission of the fault signal in response to a determination that a fault has occurred during the interval.

* * * * *